United States Patent [19]

Meyer et al.

[11] Patent Number: 4,567,230
[45] Date of Patent: Jan. 28, 1986

[54] 1-COMPONENT COATING COMPOSITION, UTILIZATION THEREOF AND PROCESS FOR MANUFACTURING A PROTECTION COATING

[75] Inventors: Rainer-Leo Meyer; Reinmar John, both of Bühl; Rolf Nagel, Baden-Baden; Günter Müller, Obersasbach, all of Fed. Rep. of Germany

[73] Assignees: BGB-Gesellschaft Reinmar John & Rainer Leo Meyer; Olga Meyer, both of Buhl, Fed. Rep. of Germany

[21] Appl. No.: 611,009
[22] PCT Filed: Sep. 15, 1983
[86] PCT No.: PCT/EP83/00246
§ 371 Date: May 14, 1984
§ 102(e) Date: May 14, 1984
[87] PCT Pub. No.: WO84/01158
PCT Pub. Date: Mar. 29, 1984

[30] Foreign Application Priority Data

Sep. 15, 1982 [DE] Fed. Rep. of Germany ....... 3234262
Sep. 15, 1982 [DE] Fed. Rep. of Germany ....... 3234261

[51] Int. Cl.$^4$ ............................................... C08K 3/08
[52] U.S. Cl. ................................... 524/786; 524/871; 524/872
[58] Field of Search ...................... 524/786, 871, 872; 528/85, 44

[56] References Cited

U.S. PATENT DOCUMENTS

| 3,420,915 | 1/1969 | Braithwaite | 528/44 |
| 3,980,597 | 9/1976 | Shihadeh | 524/786 |
| 3,994,735 | 11/1976 | Ishihara et al. | 106/14.24 |
| 4,426,488 | 1/1984 | Wyman | 525/786 |

*Primary Examiner*—Lewis T. Jacobs

[57] ABSTRACT

A moisture-setting single-component coating composition has a content of 15 to 70 wt.-% of polyurethane-forming isocyanate, 5 to 25 wt.-% of light-colored, liquid, aromatic hydrocarbon resin of low molecular weight containing hydroxyl groups, 0.2 to 2 wt.-% of antisettling agent, 10 to 35 wt.-% of foliated filler, 2 to 25 wt.-% of tinting pigments, 1 to 5 wt.-% of moisture-binding agent, remainder, but no less than 5 wt.-% of conventional paint solvent. This coating composition can be applied in a conventional manner to a dirt- and dust-free substrate in a thickness of at least 20 microns, and sets of itself by the access of moisture from the ambient atmosphere. The coating composition is suitable especially for the protection of roofs of all kinds, for coating concrete, for protecting reinforced concrete against corrosion, for the painting of steel roofs and/or for the sealing of flat roofs covered with roofing felt.

16 Claims, No Drawings

1-COMPONENT COATING COMPOSITION, UTILIZATION THEREOF AND PROCESS FOR MANUFACTURING A PROTECTION COATING

The invention relates to coating compositions which are chemically hardening compositions owing to their content of polyurethane-forming isocyanate. Particularly the invention relates to single-component coating compositions of this kind which are stable in storage in the ready-mixed state if moisture is excluded, but which harden after the access of moisture. Furthermore, the invention relates to a method of producing a protective coating with such coating compositions, and a variety of applications therefor. The coating compositions are especially suitable for the protection of buildings, say for the protection of roofs of all kinds, for sealing flat roofs covered with roofing felt, for the coating of concrete and/or for the protection of reinforced concrete against corrosion.

Coating compositions for the protection of buildings are known. The known preparations include, for example, acrylates which can be diluted with water, but which have to be applied in several coats, and in practice offer no satisfactory protection. Another known coating composition consists of a 2-component epoxy resin system, but it can be applied only under certain conditions of temperature and atmospheric humidity, and involves difficulties as regards pot life. Also known are coating compositions on the basis of combinations of coal tar with polyurethanes (cf. "Farbe und Lack", pp. 701–705 [1977]). Coal tar is typically characterized by its black color and its sticky consistency, and consists almost exclusively of aromatic compounds which contain, in addition to carbon and hydrogen, a certain percentage of hetero atoms such as oxygen, nitrogen and sulfur. Some of these hetero atoms are present in hydroxide groups and amino groups, and therefore such tar contains active hydrogen atoms which can react with isocyanate groups. Typically, therefore, mixtures of coal tar and polyurethane-forming isocyanate are not single-component coating compositions.

In general it can be stated that the known coating compositions require for their application an air temperature above 10° C. and a relative atmospheric humidity under 80%. For the achievement of useful protection, the known coating compositions must be applied in an amount of at least 170 grams per square meter per coat. Even if these minimal requirements are met, the known coating compositions have not been fully satisfactory; in practical use the following difficulties, in particular, have occurred:

the diffusibility of the coating composition was insufficient;

the coating composition had to be applied at least twice;

the cured protective coat had but little elasticity;

on account of its excessive weathering the renewability of the protective coat was poor;

in the course of time severe chalking occurred (and for this reason the pertinent regulations for these known systems call for renewal after no more than five years);

the coating composition can be applied only in good, dry weather;

the finished coating has a very poor impermeability;

the known mixtures of coal tar and polyurethane-forming isocyanate necessarily suffer the disadvantages associated with coal tar, such as black color, tar bleeding through overcoatings, and degradation of the coal tar content by ultraviolet radiation.

Setting out from this, the problem to which the present invention is addressed consists in the production of a single-component coating composition for the protection of buildings, which will harden by the access of moisture, and which will offer decided improvements with regard to at least some, but preferably all, of the abovenamed difficulties and disadvantages of the known systems.

The solution of the above problem in accordance with the invention is a coating composition made up as specified in claim 1.

In contrast to the known coal tar, the hydrocarbon resin contemplated in accordance with the invention is a colorless to slightly yellowish oil, so that the composition in accordance with the invention yields clear-colored and light, even white, coatings which nevertheless have the advantageous "polyurethene-coal tar coating qualities." The light-colored coatings obtainable in accordance with the invention are less warmed by solar radiation and are substantially less severely degraded by ultraviolet radiation than the known coatings containing coal tar.

Also subject matter of the invention is a process for the production of a protective coating in which the single-component coating composition of the invention is applied to a clean substrate and is set by the access of moisture from the ambient atmosphere.

Since the coating composition of the invention is packaged as a single-component system, it can be stored with the exclusion of moisture virtually indefinitely, and yet cures after application to the desired substrate by the access of atmospheric humidity from the ambient atmosphere within about 10 to 30 minutes, so that, after as little as about 30 minutes, one or more additional coats can be applied if required. After about 15 to 20 hours, the entire coating is completely cured, and can be exposed to the anticipated stresses.

The coating composition of the invention is quite generally suitable for the production of coatings for the protection of buildings. Preferred applications relate to the protection of roofs of all kinds, including the sealing of flat roofs covered with roofing felt, also the coating of concrete, and the protection of reinforced concrete against corrosion.

Advantageous developments and improvements of the invention will be found in the subordinate claims.

The coating composition of the invention offers the advantages and particularities listed herewith in summary form:

the coating composition is workable down to temperatures below 5° C.;

the coating composition is workable even at relatively high atmospheric humidity, of, for example, more than 90%;

the coating composition is self-leveling;

the coating produced from the composition offers outstanding protection against ultraviolet radiation;

the finished coating has good reflectivity for light and radiant heat;

even in slight thicknesses, of the order, for example, of only 50 microns, the finished coating has a high pore tightness;

the finished coating has good elasticity and high strength of adherence;

even after weathering, the renewal of the coating involves no problems;

no more than a simple, conventional surface preparation is necessary for the application of the coating composition;

the coating is flame-retardant, and even in great thicknesses, of more than 200 microns, for example, no cracking of the coating occurs upon curing.

The invention will be explained in detail below, in conjunction with preferred embodiments.

The coating composition of the invention is characterized by a content of the necessary components listed below, in the proportions stated:

15 to 70 wt.-% polyurethane-forming isocyanate;
5 to 25 wt.-% light-colored, fluid aromatic hydrocarbon resin of low molecular weight, containing hydroxyl groups;
0.2 to 2 wt.-% antisettling agents;
10 to 35 wt.-% foliated fillers;
2 to 25 wt.-% tinting pigments;
1 to 5 wt.-% moisture-binding agent,
Balance, but at least 5 wt.-%, conventional paint solvent.

In addition to the listed necessary components, the coating composition of the invention can contain conventional additives commonly used in paint technology, such as antibacterial or fungicidal agents, additives to inhibit degradation by light, heat and/or corrosive influences, and other conventional additives adapted to special requirements (to suppress the formation of bubbles, for example), or anti-drip agents.

The polyurethane-forming isocyanate can be the known diisocyanates, triisocyanates and polyisocyanates of low molecular weight, for example the group of isocyanates sold under the commercial name, "Desmodur". Good results have been achieved, for example, with toluylene diisocyanates, it being possible to use either 2,4- or 2,6-toluylene diisocyanate, or the commercial isomer mixture. Furthermore, diphenylmethane-4,4'-diisocyanate or hexamethylene-1,6-diisocyanate can be used as polyurethane-forming isocyanate.

As an additional important component, the coating composition of the invention contains a liquid aromatic hydrocarbon resin containing hydroxyl groups. In contrast to the known tar, especially coal tar, the hydrocarbon resin contemplated by the invention is a pale, i.e., colorless to slightly yellowish material having a Barrett paleness of 0.5 to 2.

The hydrocarbon resin is liquid, and at 25° C., for example, it has a viscosity between 700 and 2000 cP.

This resin is an aromatic material of a low mean molecular weight of less than 600. The density of this hydrocarbon resin has a value at 20° C. between 1.0 and 1.2 grams per cubic centimeter.

The acid number of the hydrocarbon resin is preferably between about 0.2 and 3.0.

The hydrocarbon resin must necessarily have a certain content of hydroxyl groups, which are preferably aromatic hydroxyl groups resulting from a previous "phenol modification" or "activation." Preferably, the hydrocarbon resin has a content of hydroxyl groups, especially aromatic hydroxyl groups, which amounts to 2.0 to 4.0% of the weight of the resin.

The hydrocarbon resin is preferably free of water and of solvents; its content of volatile components is less than 10% and, in certain commercial products, it can amount to about 5 to 8%, by weight.

Hydrocarbon resins of this type are known in the chemical industry, and are offered by suppliers, especially for the requirements of paint manufacturers. The terms, "special light-resistant tar" and "albino tar" and the like, are used in the industry to describe these materials. Within the scope of the present invention, examples of materials which can be used as hydrocarbon resins are materials sold by VFT-Vertriebsgesellschaft fuer Teererzeugnisse mbH, Essen, Federal Republic of Germany, under the product name, "activated VFT special liquid resins."

Antisettling agents for coating compositions of the kind here involved are known in the art; antisettling agents which are known and are usable within the scope of the invention include, for example, montmorillonites, silica, hydrogenated castor oil, and the like.

Foliated extenders or fillers are also known. Foliated fillers which are known and usable within the scope of the present invention include, for example, talc, barium sulfate, flaky pigments on the basis of Si/Al oxides, and comparable fillers. The fillers contemplated by the invention are to be low in, and preferably free from, carbonate and/or carbon dioxide-yielding components, so as to assure a long shelf life when mixed with polyisocyanate.

Tinting pigments for coating compositions of the kind herein considered are also known. They provide especially the light and heat reflecting quality of the protective coating and give it a specific color. Suitable tinting pigments are commercially available, for example, under the commercial names, "Sicominpigmente", "Heliogenpigmente", "Litholpigmente" and the like.

From another aspect of the invention, at least part of the "tinting" pigments are to consist of aluminum powder; foliated aluminum powder of a surface area of less than 45 microns [sic] is preferred. The aluminum content amounts preferably to 20 to 80% of the weight of the tinting pigment; very preferably, the coating composition contains aluminum pigment in the amount of 1 to 6% of the total weight of the coating composition.

The moisture-binding or moisture-withdrawing agents can be finely divided natural and synthetic zeolites (for example the "Zeolith 1" paste sold by Bayer AG), and also molecular sieves of aluminum oxide and silicon dioxide compounds, with titanium added if desired. Also, agents which chemically bind water can be used, such as monoisocyanates, for example. Moisture-binding and moisture-withdrawing agents of this kind are also commercially available.

The lacquer and varnish solvents are the known solvents and solvent mixtures. Good results have been obtained, for example, with commercially available aromatic mixtures having a molecular weight of 100 to 200. Furthermore, the solvents commonly used in the paint industry, on the basis of aliphatic esters, such as acetates, propionates and/or butylates, can be used; higher esters are less desirable, because then the drying time is excessively long.

The preparation of the coating composition of the invention can be performed by techniques common in the paint industry. Usually the components are placed in a vat in the prescribed amounts and mixed by means of a highspeed stirrer or dissolver. It has been found good practice to start with the mixture of polyurethane-forming isocyanate and hydrocarbon resin and then add the rest of the components successively, the moisture-binding agent being added at the end. A stirring time of 10 to 20 minutes at room temperature has proven sufficient. Experience has shown that a slight warming, to about 40° C., for example, can take place, but it is to be attributed not to reaction heat but to the shear forces involved. Lastly, the solvent is added in the necessary amount to assure the workability of the composition, and then the mixture is stirred again briefly. The result is a self-leveling, structurally viscous composition which is ready to use in this form.

If necessary, the coating composition can be stored, the shelf life at room temperature amounting to at least 6 months. Some samples have been stored for more than 12 months without perceptible increase in viscosity or decrease in reactivity.

Since the coating composition is a single-component system, it has no appreciable pot life. After the container is opened the material is to be used right away, otherwise it will skin over and slowly set by the access of moisture.

The application of the coating composition to the substrate can be performed by conventional methods, e.g., by roller or by spraying; the high-pressure, airless spraying method has proven practical.

The coating composition is applied to the substrate in a thickness of at least 20 microns; a coating thickness of about 50 to 70 microns is preferred. It is also possible to apply several successive coats after the preceding coat has thoroughly cured. A coat 45 microns thick dries, for example, under ambient conditions, in about 15 minutes and is workable after about 30 minutes, so that one or more additional coats can be applied. After about 18 hours the coating is completely cured and solid, and can be exposed to the anticipated stresses. After weathering and/or aging, even over a period of a year and longer, the film obtained from the coating composition of the invention can easily be recoated with the same material.

The preparation of the substrate requires no special measures; it is sufficient if the substrate is free of dust and dirt, and this can be achieved simply by sweeping it off. There are no special requirements as regards the dryness of the substrate. The coating composition of the invention can also be applied to moist, but not wet, surfaces without thereby impairing the setting and curing or the quality of the finished coating.

After the coating composition has been applied to the substrate it hardens of itself by the access of moisture from the ambient atmosphere, without the need for special measures.

From another viewpoint of the invention, a moisture-setting single-component coating composition is provided, which, within the composition described above, has a relatively small content of polyurethane-forming isocyanate. Preferably, this special coating composition contains the necessary components listed above, in the following percentages:
15 to 40 wt.-% polyurethane-forming isocyanate,
5 to 25 wt.-% of the hydrocarbon resin described in detail above,
0.5 to 2 wt.-% antisettling agent,
15 to 35 wt.-% foliated filler,
5 to 25 wt.-% tinting pigments,
1 to 5 wt.-% moisture-binding agent,
Remainder, but at least 5 wt.-%, ordinary paint solvent.

In this embodiment, too, a certain part of the tinting pigments is to consist of aluminum powder; preferably the aluminum powder amounts to 20 to 80%, by weight, of the tinting pigments. It is greatly preferred that the polyurethane-forming isocyanate amount to from 15 to 30% of the total weight of the coating composition. For this embodiment, the polyurethane-forming isocyanate is preferably a toluylene diisocyanate having an isocyanate group content of 5.5 to 7.5% of the weight of the isocyanate.

This "relatively low-isocyanate" embodiment of the invention is outstandingly suited, on account of its good elasticity, its high strength of adhesion to many different materials, and its resistance to ultraviolet radiation, for the protection of buildings, especially for the protection of roofs of all kinds, such as, for example, Eternit roofs, roofs insulated with polyurethane foam, and the like. Another type of application in the roofing field is foam coating, namely roof foam coating in the case of so-called "reverse" roofs. This special coating composition is furthermore suitable for the protective coating in structural engineering, in industrial and power construction, in hydraulic steel construction, in shipbuilding, in offshore engineering, and the like. Where the coating of steel with this special coating composition is undertaken, preliminary sandblasting (Sa 2.5) is recommended; to achieve an especially great protection against corrosion, priming can be performed. This special coating composition is furthermore suitable for sealing concrete and for protecting reinforced concrete against corrosion. In any case, an outstanding resistance to radiation, light, heat and/or corrosive influences is provided.

Another special embodiment of the invention has a relatively high content of polyurethane-forming isocyanate within the composition specified above. For this special embodiment, the following composition is preferred:
40 to 70 wt.-% polyurethane-forming isocyanate,
5 to 25 wt.-% hydrocarbon resin,
0.2 to 1 wt.-% antisettling agent,
10 to 20 wt.-% foliated filler,
2 to 15 wt.-% tinting pigments,
1 to 4 wt.-% moisture-binding agent,
Balance, but at least 5 wt.-%, lacquer and varnish solvent.

Also in the coating composition of this additional special embodiment, at least a part of the tinting pigment is to consist of aluminum powder; preferably the aluminum powder content is to be from 20 to 80% of the total weight of the tinting pigments.

This "relatively high-isocyanate" coating composition preferably contains a diphenylmethane diisocyanate as the polyurethane-forming isocyanate, especially one containing from 9 to 12% by weight of isocyanate groups.

Especially preferred is a mixture of different diphenylmethane diisocyanates which differ in regard to their isocyanate content. In this respect, particularly good results have been obtained when the total content of 40 to 70%, by weight, of polyurethane-forming isocyanate consists (with respect to the total weight of the coating composition) of:

(a) 30 to 50 wt.-% of diphenylmethane diisocyanate containing 8 to 9% isocyanate groups with respect to the isocyanate weight, and (b) 10 to 20 wt.-% of diphenylmethane diisocyanate with an isocyanate group content of 14 to 17% with respect to the isocyanate weight.

A relatively isocyanate-rich coating composition of this kind, containing different diphenylmethane diisocyanates, yields after contact with moisture an easily foaming coating, which has a seam-sealing action, especially in the coating and sealing of roofs covered with roofing felt. In spite of this foaming, the resultant film is very tight-pored and waterproof. This special additional coating composition can be applied at temperatures from +5° to +40° C. air temperature, and even at high atmospheric humidity, such as for example a relative humidity of over 90%. This coating composition is on the one hand self-leveling and on the other hand applicable in thick coats, so that coats of a thickness of up to 200 microns and more can be applied in a single application. When it cures, this composition forms an easily foaming film which also equalizes unevenness in the substrate and seals seams. The coating obtained from this additional special composition has a high pore tightness, high elasticity and high strength of adherence. With regard to the preferred application, namely to the sealing of flat roofs covered with roofing felt, this additional special coating composition contains preferably lacquer and varnish solvents on the basis of aliphatic esters, such as acetates, propionates and/or butylates, for the purpose of preventing the softening and/or dissolution of the tar components in the roofing felt by aromatic solvent components.

This additional special coating composition can be applied in a single coat up to a thickness of 1000 microns without the occurrence of adhesion failures or the like.

As previously stated, this additional special coating composition is intended especially for the sealing of flat roofs covered with roofing felt. For this purpose the coating composition is applied in a thickness of at least 50 microns. It is preferred that at least 500 g of coating composition be applied per square meter of roofing felt. Due to the slight foaming that takes place during the cure, this coating composition also penetrates into seams, overlaps and edges of the roofing felt and assures a seam seal that will last for many years.

We claim:

1. Moisture-setting single-component coating composition, comprising from about:
15 to 70 wt.-% polyurethane-forming isocyanate,
5 to 25 wt.-% light-colored, liquid, aromatic hydrocarbon resin of low molecular weight containing hydroxyl groups,
0.2 to 2 wt.-% antisettling agents,
10 to 35 wt.-% foliated fillers,
2 to 25 wt.-% tinting pigment,
1 to 5 wt.-% moisture-binding agent, balance, but not less than 5% by weight, of conventional paint solvent.

2. Moisture-setting single-component coating composition for the protection of buildings, comprising from about:
15 to 40 wt.-% polyurethane-forming isocyanate,
5 to 25 wt.-% light-colored, liquid, aromatic hydrocarbon resin of low molecular weight containing hydroxyl groups,
0.5 to 2 wt.-% antisettling agent,
15 to 35 wt.-% foliated fillers,
5 to 25 wt.-% tinting pigments,
1 to 5 wt.-% moisture-binding agent, balance, but at least 5% by weight, of conventional paint solvent.

3. Single-component coating composition of claim 2, wherein the content of polyurethane-forming isocyanate amounts to 5 to 30% of the total weight of the coating composition.

4. Single-component coating composition of claim 1 or 3, wherein the polyurethane-forming isocyanate has a content of isocyanate groups of 5.5 to 7.5% with respect to the isocyanate weight.

5. Single-component coating composition of claim 2, wherein the polyurethane-forming isocyanate is a tolylene diisocyanate, or a mixture of different toluylene diisocyanate isomers.

6. Single-component coating composition of claim 2, wherein the paint solvent is a mixture of aromatic hydrocarbons.

7. Moisture-setting single-component coating composition for sealing flat roofs covered with roofing felt, comprising from about:
40 to 70 wt.-% polyurethane-forming isocyanate,
5 to 25 wt.-% light-colored, liquid, aromatic hydrocarbon resin of low molecular weight containing hydroxyl groups,
0.2 to 1 wt.-% antisettling agent,
10 to 20 wt.-% foliated filler,
2 to 15 wt.-% tinting pigments,
1 to 4 wt.-% moisture-binding agent, balance, but no less than 5% by weight, of paint solvent.

8. Single-component coating composition of claim 7, wherein the polyurethane-forming isocyanate has an isocyanate group content of 9 to 12% of the isocyanate weight.

9. Single-component coating composition of claim 7 or 8, wherein the polyurethane-forming isocyanate is diphenylmethane diisocyanate.

10. Single-component coating composition of claim 7, wherein the total content of 40 to 70 wt.-% polyurethane-forming isocyanate with respect to the total weight of the coating composition comprises from about:
  (a) 30 to 50 wt.-% of diphenylmethane diisocyanate having an isocyanate group content of 8 to 9%, with respect to the isocyanate weight, and
  (b) 10 to 20 wt.-% of diphenylmethane diisocyanate with an isocyanate group content of 14 to 17% of the isocyanate weight.

11. Single-component coating composition of claim 7, wherein aliphatic hydrocarbons of a molecular weight of about 100 to 150, containing ester groups, serve as lacquer and varnish solvents.

12. Single-component coating composition of claim 1, wherein the hydrocarbon resin—with respect to the resin weight—has a hydroxyl group content of 2 to 4%.

13. Single-component coating composition of claim 1, wherein the hydrocarbon resin has at 25° C. a viscosity of 700 to 2000 cP.

14. Single-component coating composition of claim 1, wherein the hydrocarbon has a Barrett paleness of 0.5 to 2.

15. Single-component coating composition of claim 1, wherein the hydrocarbon resin has at 20° C. a density between 1.02 and 1.2 grams per cubic centimeter.

16. Single-component coating composition of claim 1, wherein a part of the tinting pigment, namely 20 to 80% of the total pigment weight, consists of aluminum powder.

* * * * *